Dec. 22, 1953     E. R. OLSEN     2,663,602
PISTON RING
Filed Jan. 17, 1951
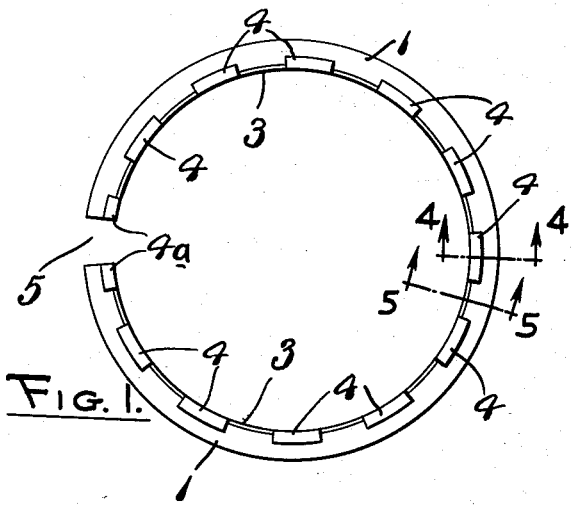
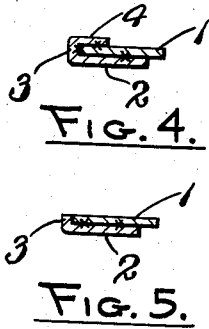
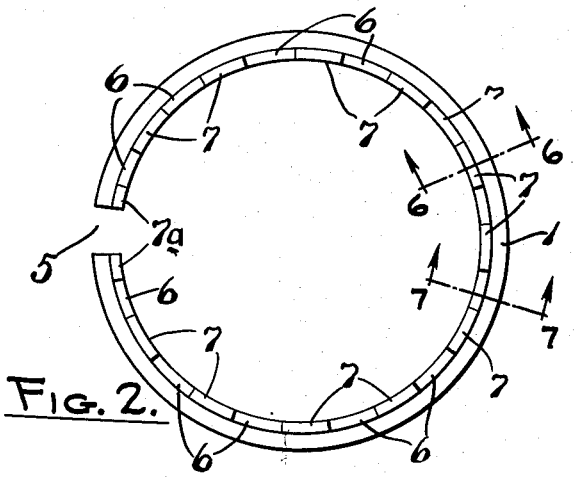
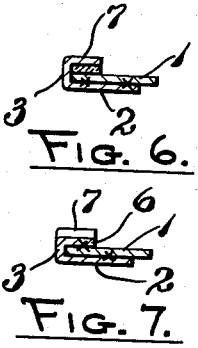
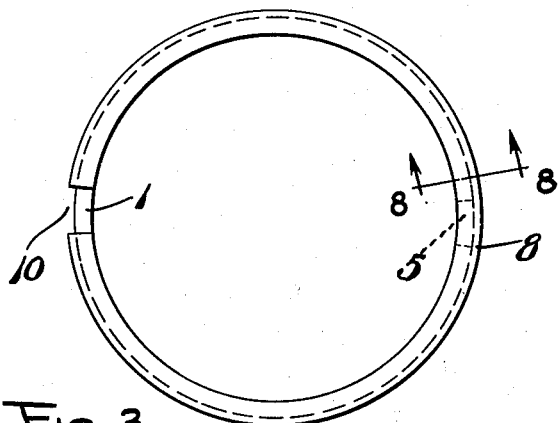
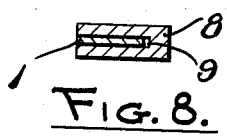
INVENTOR
ERNEST R. OLSEN
BY
ATTORNEYS Patented Dec. 22, 1953

2,663,602

UNITED STATES PATENT OFFICE 2,663,602

PISTON RING

Ernest R. Olsen, Grand Haven, Mich.

Application January 17, 1951, Serial No. 206,408

4 Claims. (Cl. 309—29)

The present invention relates to a novel piston ring, which is primarily concerned with novel structure for increasing and controlling ring tension, with an increase in the force required for closure of the piston ring at its gap, which may equalize the radial wall pressure to be imparted to the cylinder wall in addition to imparting a controlled expansive force.

The invention is applicable both to steel rings or, more properly, thin steel rails of the type which are used in the oil grooves of pistons, or to the cast iron compression rings. In both, the steel rail of thin material, usually 20 to 25 thousandths of an inch thick, is held and maintained against dishing when it is contracted by closing at the parting, so that the rail in oil rings or the like, where bearing against a cylinder wall is normal with the wall and stays in such position and does not vary or flutter in the up and down reciprocating movements of the piston.

With the cast iron compression rings, the steel rail does not bear against the cylinder wall but is held against dishing, that is, cross sections of the steel rail taking an inclined plane at a slight acute angle to normal horizontal position, and the force which is required to maintain the steel rail flat, and in its non-dished form, reacts against the cast iron member to increase its tension and maintain uniform bearing of the cast iron ring against a cylinder wall. With the all steel rings, in accordance with my invention, in which an outer edge of the steel rail or rails contacts a cylinder wall, the same action occurs attaining the same results of proper and even an increased bearing pressure against the cylinder wall.

It is an object and purpose of the present invention to provide a novel and particularly practical and useful piston ring, in which the steel rails, which preferably initially will be made perfectly flat and lie in a horizontal plane, are maintained in such plane at all times under all conditions of the ring, contracted or non-contracted. Such ring is also especially economical to produce, and the invention is usable either in conjunction with rings sealing against oil passage to the combustion chamber, or the passage of fuel mixture or the products of combustion therefrom downwardly, as well as, at the lower portions of a piston, collecting and saving excess lubricating oil and returning it to the engine crank case, in conjunction with the usual vented oil ring grooves of pistons in internal combustion engines.

An understanding of the invention may be had from the following description, taken in connection with the accompanying drawing, in which:

Figs. 1, 2 and 3 are plan views showing three forms of embodiment of my invention in piston rings.

Figs. 4 and 5 are somewhat enlarged vertical transverse sections taken, respectively, on the planes of lines 4—4 and 5—5 of Fig. 1.

Figs. 6 and 7 are similar sections taken, respectively, on the planes of lines 6—6 and 7—7 of Fig. 2 and Fig. 8 is a like vertical transverse section substantially on the plane of line 8—8 of Fig. 3.

Like reference characters refer to like parts in the different figures of the drawing.

In the structure of the piston ring shown in Figs. 1, 4 and 5, a flat steel rail 1 is permanently secured, preferably by soldering, to an underplate 2 of thin metal having a thickness approximating the thickness of the rail 1. The width of the plate 2 is less than the rail 1 so that the outer edge of the rail, which will come against a cylinder wall, is positioned a short distance beyond the corresponding edge of such underplate 2. Integral with the underplate 2 is an upwardly extending short leg 3 against which the inner curved edge of the rail 1 engages. From said leg 3 spaced lips 4, integral with the leg 3 extend, and are bent outwardly to overlap the upper side of the rail 1, and are soldered thereto. The plate 2, leg 3 and clinching lips 4 preferably are made from a single length of metal.

Both the rail 1 and the member to which it is attached are parted at one side so that in the completed ring, as shown in Fig. 1, a parting 5 is made where the ends of the ring normally separate. Such parting is closed when the ring is contracted and is operating in a cylinder, the interior diameter of which is but slightly larger than the exterior diameter of the rail 1 when in its contracted, parting-closed position.

In Fig. 2, a slightly different form of structure of piston ring is shown. The flat rail 1 is the same as before. The underplate 2 is also the same. The upwardly extending leg 3 is longer and integral with it is a continuous annular lip with alternate depressings and rises 6 and 7. The undersides of the depressed portions 6 lie against the upper side of the rail 1, while the raised portions 7 are above and spaced therefrom. The two parts of the ring are permanently secured together preferably by soldering.

Of course, substantially the same ring may be provided by using the rail 1, the under member 2 and the short leg 3 of Fig. 4, making a permanent soldered connection of the parts and at the upper side of the ring, solder a corrugated strip having the same width as the lip shown in Fig. 2, having alternate depressed and raised portions 6 and 7, the under sides of the depressed portions 6 having a soldered or other equivalent secure and permanent connection to the rail 1.

In both of the forms of piston rings shown in Figs. 1 and 2, a number of them may be put in a piston ring groove so as to present the edges of a plurality of the rails 1 to the cylinder wall, and with openings or vents between the rings for oil passage. Such piston rings, all of steel, press against the cylinder walls with a heavy unit pressure. Any boosters in the form of spring expander rings located in the bottoms of the piston ring grooves and bearing against the under edges of the parts are eliminated. The flat rails 1 retain and are maintained in their perfectly flat condition.

In the form of ring shown in Figs. 3 and 8, a regular cast iron compression piston ring, indicated at 8, is provided with a narrow relatively deep groove 9 from its inner curved side outwardly toward, but short of, its outer curved side and midway between the opposed sides of the ring. The steel rail 1 is inserted in this groove, its parting 5 preferably being diametrically opposite the parting 10 in the rail 8. On closing the piston ring at the parting 10 the parting 5 will also be closed. The rail 1 is held against dishing. It imparts an additional force to the outer ring 8 adding its force of expansion to that of the outer ring, and eliminating the usual spring expanded rings at the bottom of a ring groove.

The piston ring structures described are exceptionally practical and very useful, economical to produce and particularly effective in use. The invention is defined in the appended claims and is to be considered comprehensive of all forms of structure coming within their scope.

I claim:

1. A piston ring comprising, a flat, thin, parted steel rail ring member having a thickness of approximately 20 to 25 thousandths of an inch, said rail being adapted to be located substantially parallel to a side of a piston ring groove in use of the ring, and a second parted, ring member of thin steel having a lower side underneath the inner portion of said rail, a short leg against the inner curved edge of the rail, and spaced lips extending from the free edge of said short leg over the upper side of the rail, said second member having permanent connection to said rail and said rail extending at its outer edges beyond said second ring member.

2. A piston ring comprising, a flat, steel rail having inherent spring tension when distorted from normal position, said rail having a thickness approximating 20 to 25 thousandths of an inch, and a parting at one side open in the normal unstressed condition of said rail, and closed when the ring, including said rail, is contracted to close the parting when in use in an engine cylinder, a plate of thin metal at the under side and inner portions of said rail permanently secured thereto, said plate being of generally circular form and having a parting in conjunction with the parting in the rail, and a second annular member at the upper side and inner portion of said rail permanently secured thereto, said second member being of annular form and having a parting in line with the parting in said rail.

3. A structure as defined in claim 2, said member at the upper side and inner portion of the rail being of corrugated form having alternate depressions and elevations, the under sides of said member at said depressions having permanent connection to the upper side of the rail.

4. A piston ring comprising, a thin steel rail approximating 20 to 25 thousandths of an inch in thickness, having a parting at one side, said rail on closing at said parting having an outer edge of substantially circular outline a plate of thin metal permanently secured at a side of the rail from its inner edges outwardly toward but short of its outer edges, and spaced means around the rail at its inner portion and opposite side providing elevations and radially located passages between said elevations, said plate and spaced means reinforcing and strengthening said rail and maintaining it in flat condition on closing the rail at the parting.

ERNEST R. OLSEN.

References Cited in the file of this patent

UNITED STATES PATENTS

| Number | Name | Date |
|---|---|---|
| 1,667,941 | Madsen | May 1, 1928 |
| 1,822,101 | Lewis | Sept. 8, 1931 |
| 2,229,107 | Luthy | Jan. 21, 1941 |
| 2,300,519 | Phillips | Nov. 3, 1942 |
| 2,427,333 | Wainwright et al. | Sept. 9, 1947 |
| 2,459,157 | Frisby | Jan. 18, 1949 |

FOREIGN PATENTS

| Number | Country | Date |
|---|---|---|
| 99,174 | Sweden | Apr. 18, 1940 |
| 906,350 | France | May 14, 1945 |